US005103100A

United States Patent [19]

Iketaki

[11] Patent Number: 5,103,100

[45] Date of Patent: Apr. 7, 1992

[54] X-RAY DETECTOR

[75] Inventor: Yoshinori Iketaki, Ome, Japan

[73] Assignee: Olympus Optical Co., Ltd., Tokyo, Japan

[21] Appl. No.: 566,107

[22] Filed: Aug. 13, 1990

[30] Foreign Application Priority Data

Aug. 16, 1989 [JP] Japan ................................ 1-210857

[51] Int. Cl.[5] ............................................ G01T 1/00

[52] U.S. Cl. ........................... 250/370.01; 250/336.1; 250/370.06; 378/156; 378/157

[58] Field of Search ...................... 250/390.01, 390.06, 250/336.1, 336.2; 378/156, 157, 158

[56] References Cited

U.S. PATENT DOCUMENTS

| | | | |
|---|---|---|---|
| 2,706,792 | 4/1955 | Jacobs | 250/370.01 X |
| 3,100,261 | 8/1963 | Bigelow | 378/157 X |
| 3,435,220 | 3/1960 | Hanken | 378/157 X |
| 3,581,087 | 5/1971 | Brinkerhoff et al. | 378/157 X |
| 3,699,339 | 10/1972 | Taczak, Jr. | 250/370.06 X |
| 4,697,280 | 9/1987 | Zarnstorff et al. | 250/252.1 X |

OTHER PUBLICATIONS

S. Aoki, "X-Ray Optical Elements and Their Applications", Japanese Journal Applied Physics, vol. 56, No. 3 (1987), pp. 342-351.

K. Tanaka, "Source of Laser Plasma X-Ray, and Their Applications", vol. 27, No. 4 (1989), pp. 187-193.

F. Biggs, et al., "Analytical Approximations for X-Ray Cross Sections II", Sandia Laboratories Report, SC-R-R-71 0507 (Dec. 1971).

B. L. Henke, et al., "Low-Energy X-Ray Interaction Coefficients: Photoabsorption, Scattering, and Reflection", Atomic Data and Nuclear Data Tables, vol. 27, No. 1, Jan. 1982.

J. Barth, et al., "Characteristics and applications of semiconductor photodiodes from the visible to the X-ray region", SPIE vol. 733, Soft X-Ray Optics and Technology (1986), pp. 481, 483-485.

KMSF Application Notes AN-3 Filter Design, pp. 3-8.

KMSF Application Notes AN-4 Standard Filters, pp. 2-10.

R. H. Day, et al., "Photoelectric quantum efficiencies and filter window absorption coefficients from 20 eV to 10 KeV", J. Appl. Phys. 52(11), Nov. 1981, pp. 6965-6973.

*Primary Examiner*—Constantine Hannaher
*Assistant Examiner*—Edward J. Glick
*Attorney, Agent, or Firm*—Cushman, Darby & Cushman

[57] ABSTRACT

An X-ray detector, which is concerned with X rays having wavelengths of less than 100 Å, includes an X-ray filter with a thickness smaller than a previously defined value, a semiconductor light-receiving element arranged behind the X-ray filter, and a measuring device for measuring an output produced by the semiconductor light-receiving element. This detector is provided with a grazing incidence mirror in front of the X-ray filter so that the wavelength selection and intensity measurement can be effected simultaneously. The X-ray detector has important advantages in practical use that the power source system does not come to a large scale, its periphery circuit is simple, and sensitivity is as high as one to two orders than that of a conventional X-ray diode.

9 Claims, 8 Drawing Sheets

PHOTON ENERGY (keV)
Al, GRAZING ANGLE OF 3°

PHOTON ENERGY (keV)
Al, GRAZING ANGLE OF 5°

PHOTON ENERGY (keV)
Au, GRAZING ANGLE OF 2.5°

PHOTON ENERGY (keV)
Au, GRAZING ANGLE OF 5°

X-RAY DETECTOR

BACKGROUND OF THE INVENTION a) Field of the Invention

This invention relates to an X-ray detector.

b) Description of the Prior Art

Recently, a great development of X-ray analyzers has taken place, to which X-ray light sources for laboratories such as small-sized synchrotons and laser plasma X-ray light sources are applied. In keeping with this development, there is a growing demand that the spectra of the X-ray light source should be easily monitored. There is, however, a limit to the use of such detectors that wavelength selection and intensity measurement can be together performed without using any specific spectroscope. For the detector which has been practically used in the region of soft X rays (whose wavelengths are less than 100 Å and relatively long) in particular, an X-ray diode (which will be hereinafter abbreviated to XRD) (refer to KMSF Application Notes, An-3, XRD Filter Design X-Ray Diodes, pages 1 and 3–8 is merely available.

The XRD is adapted to utilize fundamentally a photoelectric effect produced when X rays are incident on a substance. FIG. 1 shows its conceptional view as is also shown in R. H. Day, et al., "Photoelectric quantum efficiencies and filter window absorption coefficients from 20 eV to 10 keV", J. Appl. Phys. 52(11), November 1981. According to FIG. 1, the XRD comprises a cathode 1 made of aluminum or the like and an anode 2 of a wire mesh shape, in front of which an X-ray filter 3 is placed. In a case where a potential difference is generated between the cathode 1 and the anode 2 by a bias power source 4, when X rays are incident on the cathode 1 through the X-ray filter 3, photoelectrons are produced in response to the quantum efficiency of a substance constitutiting the cathode 1. Then, the photoelectrons flow as an electric current through the anode 2, so that if the amount of current flow or electric charge is measured by a measuring device 5 such as an oscilloscope, the amount of light of X rays can be monitored. The reason why the XRD permits also the wavelength selection is that each of the cathode 1 and the X-ray filter 3 has its own quantum efficiency and transmittance. FIG. 2 shows the relationship between the photon energy of incident X rays and the amount of electric charge produced per unit X-ray energy (namely, the quantum efficiency) in the Al cathode 1 (refer to KMSF Application Notes, AN-3, XRD Filter Design, X-ray Diodes, pages 1 and 3–8 and KMSF Application Notes, AN-4, Standard KMSF Filters, pages 1–10).

FIG. 3, on the other hand, shows the relationship between the photon energy of X rays and the X-ray transmittance of the X-ray filter 3 made of carbon having a thickness of 0.1 μm. According to FIG. 2, the Al cathode 1 serves as a low-pass filter with respect to the photon energy of X rays since the quantum efficiency tends to diminish as the photon energy increases. According to FIG. 3, in contrast to this, the X-ray filter 3 assumes the role of a high-pass filter. Therefore, it follows from this that the X rays to be detected traverse both the low-pass filter and the high-pass filter due to the construction of the XRD and the X rays of a certain particular photon energy band can be detected. FIGS. 4A and 4B depict its actual examples. Specifically, FIG. 4A shows the quantum efficiency (the number of electrons produced in the detecting system by an individual photon) in the case of the use of the Al cathode 1, the X-ray filter configured by a Pb filter 0.3 μm thick and an N-Parylene filter 0.1 μm thick put together (refer to KMSF Application Notes, AN-4, Standard KMSF Filters, pages 1–10), and the anode 2 with an Ni mesh.

Further, FIG. 4B shows the quantum efficiency in the case of the use of the Al cathode 1, the X-ray filter configured by the Pb filter 0.3 μm thick, the N-Parylene filter 0.1 μm thick, and a Be filter 0.6 μm thick put together (refer to KMSF Application Notes, AN-4Standard KMSF Filters, pages 1–10 , and the anode 2 with the Ni mesh. According to FIGS. 4A and 4B, it is noted that a band-pass is formed between 2 keV and 3 keV of the photon energy.

The detector of the XRD, by the way, has difficulties in the following two points, though simple in structure.

(1) In FIG. 1, it is required that a bias voltage of more than several hundred volts is applied between the anode 2 and the cathod 1, so that problems arise that its power source system comes to a large scale with a complicated peripheral circuit.

(2) As shown in FIG. 2, the quantum efficiency of the Al cathode 1 is low, so that problems are encountered that the entire quantum efficiency is reduced to nearly 0.01 and consequently the value of S/N will be diminished when a weak signal is detected.

SUMMARY OF THE INVENTION

A primary object of the present invention is to provide an X-ray detector in which sensitivity is as high as one to two orders than that of a conventional X-ray diode.

Another object of the present invention is to provide an X-ray detector which is operable on a low voltage compared with the conventional X-ray diode.

The X-ray detector according to the present invention, which can be used for X-rays having wavelengths of less than 100 Å, is characterized by comprising an X-ray filter having a thickness smaller than a value d defined by the following formula, a semiconductor light-receiving element disposed behind the X-ray filter, and a measuring device for measuring an output issued from the semiconductor light-receiving element:

$$d = 0.054\lambda/k$$

where λ is the wavelength of an X-ray being detected and k is the imaginary part of the complex index of refraction of a substance constituting the filter.

According to the present invention, the X-ray detector makes use of a total reflection mirror as a low-pass filter so that the combination with the low-pass filter makes it possible to perform the wavelength selection and intensity measurement of X-rays at the same time.

Further, according to the present invention, two X-ray filters different in thickness from each other are combined with two diodes of the same type to measure the differential in output between the two diodes and thereby the X-rays of particular photon energy can easily be detected.

These and other objects as well as the features and the advantages of the present invention will become apparent from the following detailed description of the preferred embodiments when taken in conjunction with the accompanying drawings.

DESCRIPTION OF THE PREFERRED EMBODIMENTS

Prior to the explanation of the embodiments of the X-ray detector according to the present invention, a description will be given of a basic consideration of the present invention in detail below, referring to FIGS. 5 to 10.

Figure 5:
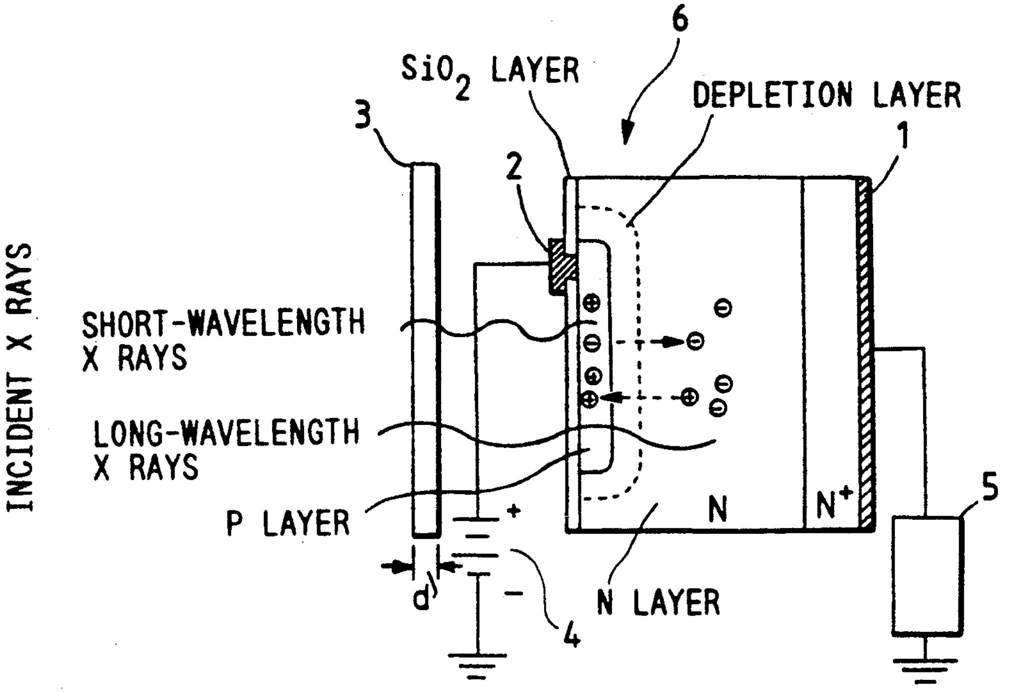
FIG. 5 is a view showing a fundamental construction of an X-ray detector according to the present invention.
Figure 6:
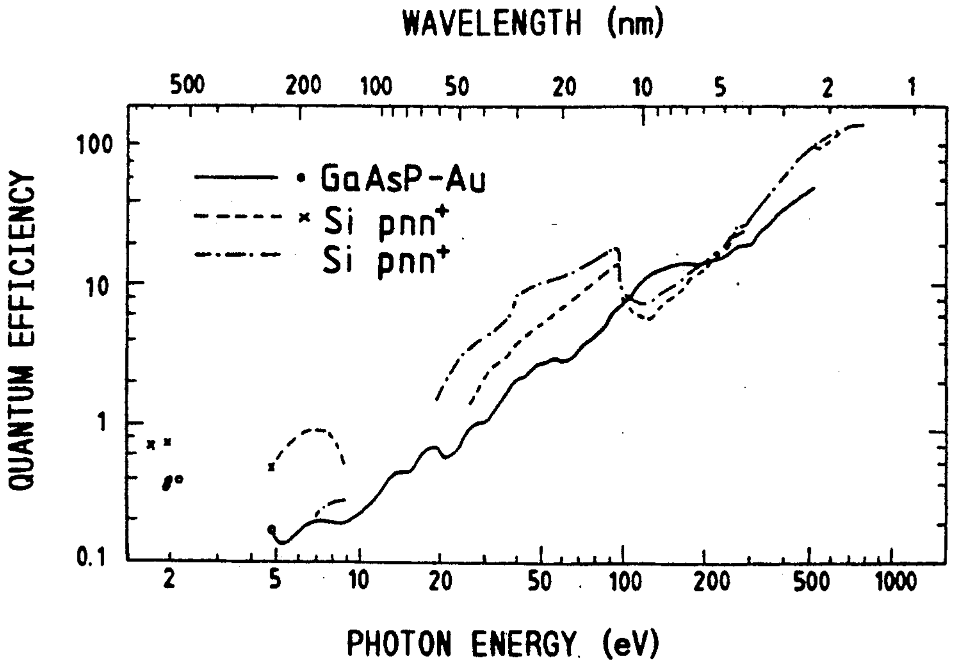
FIG. 6 is a diagram showing the dependence of the quantum efficiency on the photon energy in an Si-PIN photodiode and a GaAsP photodiode both made by HAMAMATSU PHOTONICS K.K.
Figure 7A:
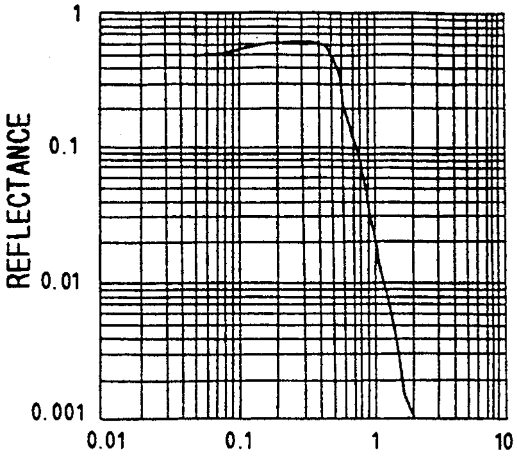
FIGS. 7A to 7D are diagrams showing the wavelength dependence of reflectances at various grazing angles of Au and Al reflecting mirrors.
Figure 7B:
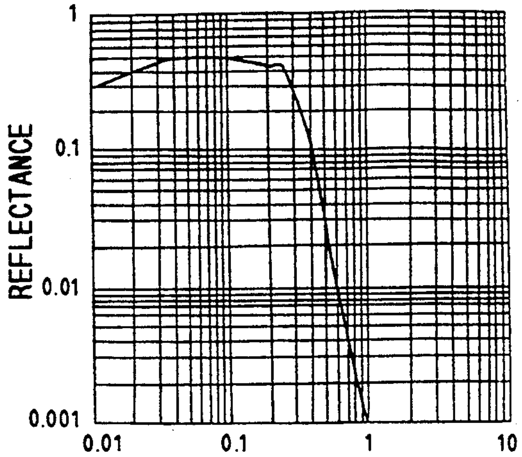
Figure 7C:
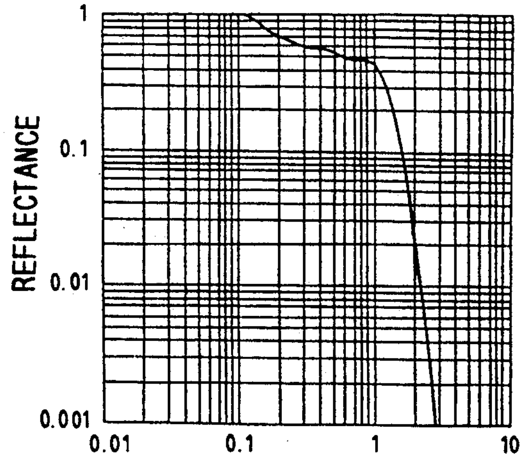
Figure 7D:
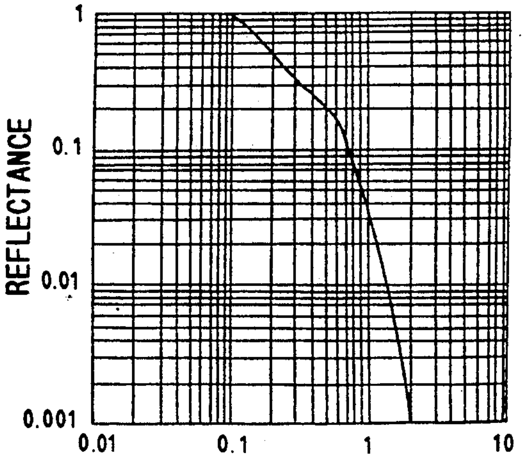

FIG. 5 shows the fundamental construction of the X-ray detector according to the present invention, in which a photodiode 6 which is a typical semiconductor light-receiving element is arranged behind the X-ray filter 3. When X rays, like visible light, are incident on the photodiode 6, electrons and holes are produced in pairs in response to the quantum efficiency. In particular, a GaAsP photodiode (Schottky type) whose surface is coated with Au diminishes considerably a distance between the surface and the P-N junction interface and has high sensitivity even in a soft X-ray region. FIG. 6 shows the dependence of the quantum efficiency on the photon energy in an Si-PIN photodiode (S1226-8BO) and a GaAsP photodiode (G1127-02) both made by HAMAMATSU PHOTONICS K.K. (refer to, J. Barth et al., SPIE Vol. 733 P.481 (1986)). According to this diagram, it is seen that the quantum efficiency of the each photodiode increases to nearly 1 keV of photon energy. Further, since the GaAsP photodiode can operate from a single low-voltage power source of about 5 V, the circuit configuration of the power source is simplified.

If a wavelength selecting function of the X-ray filter 3 is added to the semiconductor light-receiving element such as the GaAsP photodiode or the Si-PIN photodiode, the semiconductor light-receiving element, like the XRD, can be used as a detector for an intensity monitor of X rays having a wavelength selecting function. Now, when the thickness of the X-ray filter 3 is taken as d and the X rays with an intensity $I_0$ are assumed to have been transmitted through the X-ray filter 3, an intensity I of transmitted light is given by $$I=I_0\exp(-4\pi kd/\lambda) \qquad (1)$$

where k is the imaginary part of the complex index of refraction of a substance constituting the filter and λ is the wavelength of an X ray.

If the thickness of the filter is designed to be $d \leqq 0.054\ \lambda/K$ in Equation (1), its transmittance will lead to 50% or more and sufficient brightness will be brought about, so that the deterioration of detection sensitivity can be prevented. Also, if this condition is expressed by the use of an absorption coefficient μ of X rays, it can be rewritten as $d \leqq 0.054 \cdot 4\ \pi/\mu$ By the way, the X-ray filter 3 and the photodiode 6 each have the property of a high-pass filter with respect to the characteristic of the quantum efficiency, so that a band-pass filter is hard to be constructed as the entire X-ray detector. As such, the following two systems are proposed.

(1) System Making Use of the Total Reflection Mirror

When the X rays are incident at a particular grazing angle on an ideal mirror surface, the reflectance R is given by $$R = \frac{(\theta - a)^2 + b^2}{(\theta + a)^2 + b^2} \qquad (2)$$

where $$a^2 = (\sqrt{(\theta^2 - 2\delta)^2 + 4\beta^2} + \theta^2 - 2\delta)/2,$$

$$b^2 = (\sqrt{(\theta^2 - 2\delta)^2 + 4\beta^2} - \theta^2 + 2\delta)/2$$

(refer to, Sadao Aoki, "X-Ray Optical Elements and Their Applications", Japanese Journal, Applied Physics, Vol. 56, No. 3 (1987), pages 342-351.

Here, when the complex index of refraction of a substance of the mirror surface is taken as $N_c=n-ik$, δ and β are connected with each other by $\delta=1-n$ and $\beta=k$, respectively. Further, θ represents the grazing angle of X rays. It is found from the discussion of Equation (2) that when the X rays of white color are reflected from the mirror surface at the particular grazing angle, the mirror surface functions as the low-pass filter in fact. FIG. 7 shows the results of discussions about the wavelength dependence of the reflectance at various grazing angles of Au and Al reflecting mirrors, by the use of Equation (2).

Figure 8:
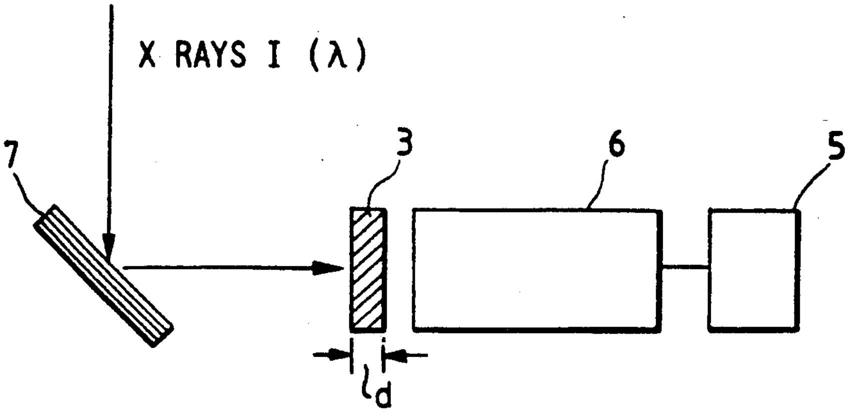
FIG. 8 is a view showing an example of the X-ray detector according to the present invention.

According to FIG. 7, it is noted that as the grazing angle and the materials of the mirror surface are varied, cutoff energy changes. Thus, the selection of the grazing angle of X rays and the materials of the mirror surface makes it possible to realize a low-pass filter with a good quality which has a considerable number of degrees of freedom. Further, by combining such a low-pass filter with a high-pass filter, a band-pass filter with a good number of degrees of freedom can be designed. Accordingly, it is noted that, as depicted in FIG. 8, the X-ray detector comprising the X-ray filter 3, the photodiode 6 made of GaAsP or the like and a grazing incidence mirror 7 enables the wavelength selection and intensity measurement of X rays to be performed at the same time.

Figure 9:
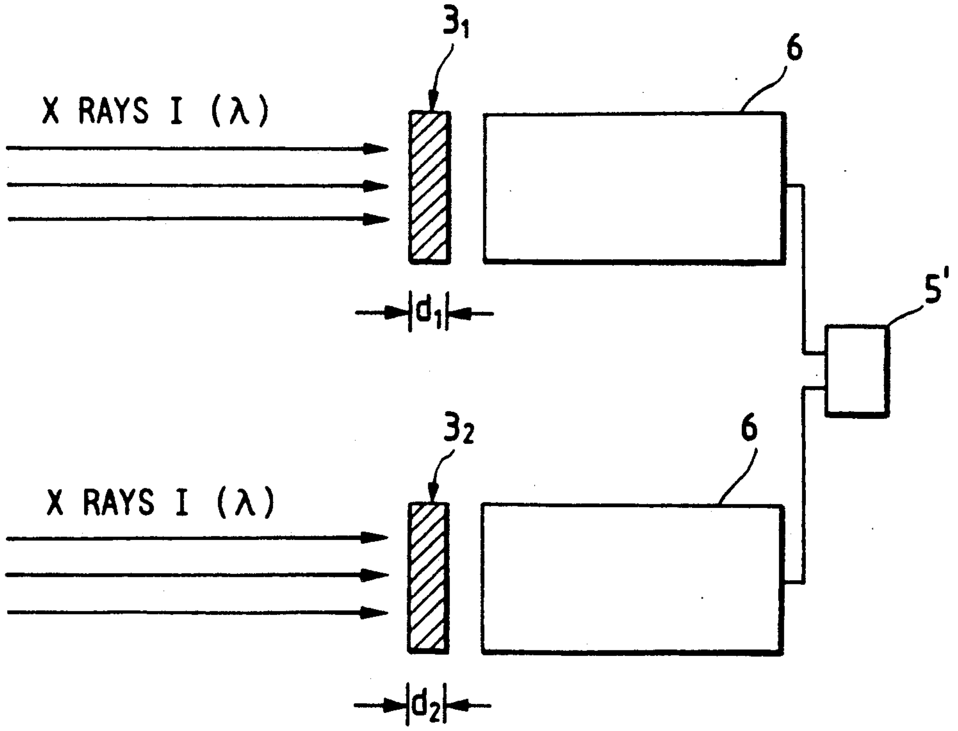
FIG. 9 is a view showing another example of the X-ray detector according to the present invention.

(2) System making use of the combination of two X-ray filters and two photodiodes This is also effective as a second system which utilizes two different X-ray filters and two photodiodes of the same type. FIG. 9 illustrates an arrangement that an X-ray filter $3_1$, made of an element with a thickness $d_1$ and an X-ray filter $3_2$ made of another element with a thickness $d_2$ are disposed in front of photodiodes 6, 6 of the same type, respectively, so that a differential signal in output between the photodiodes 6, 6 is measured by a measuring device 5'.

Figure 10A:
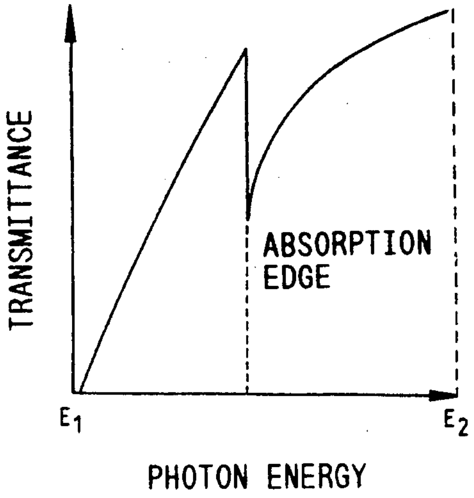
FIGS. 10A to 10C are diagrams showing the dependence of the transmittances of two X-ray filters on the photon energy and the differential transmittances in FIG. 9.
Figure 10B:
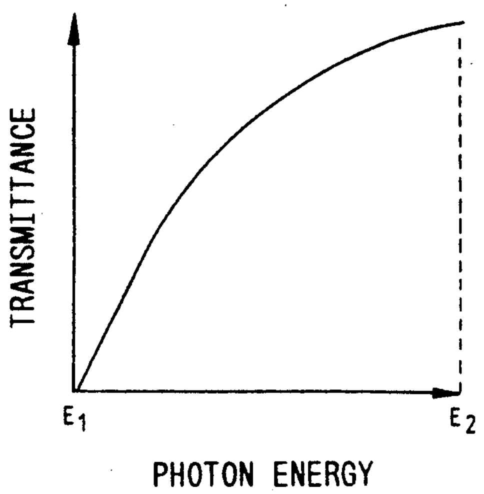
Figure 10C:
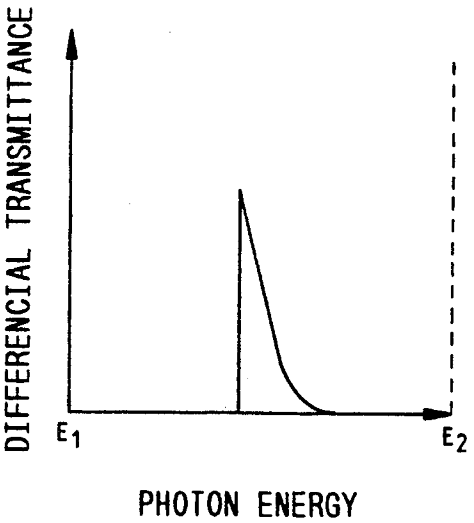

In general, each element is remarkably low in transmittance in a photon energy region adjacent to an absorption edge. If the X-ray filter is made of such an element that the absorption edge exists in photon energy bands $E_1 \sim E_2$, the dependence of the photon energy on the transmittance is as shown in FIG. 10A. On the other hand, for the X-ray filter made of such an element that no absorption edge exists in the photon energy bands $E_1 \sim E_2$, the dependence of the photon energy on the transmittance is as shown in FIG. 10B. According to FIG. 10B, the transmittance of X rays is higher as the photon energy increases. Now, in FIG. 9, it is assumed that the element of the X-ray filter $3_1$ is selected so as to have a single absorption edge between the photon energy bands $E_1 \sim E_2$ and that of the X-ray filter $3_2$ is selected so as not to have any absorption edge therebetween. If thicknesses of the two types of X-ray filters $3_1$, $3_2$ are then adjusted, the value of the difference in transmittance between the two types of X-ray filters $3_1$, $3_2$ can be increased only in the vicinity of the absorption edge of the X-ray filter $3_1$ as shown in FIG. 10*c*. Thus, when the X rays whose intensity spectra are limited to the region of the photon energy bands $E_1 \sim E_2$ are determined by the use of two such sets of X-ray filters and photodiodes and the differential signal between them is measured by the measuring device 5', the intensity of X rays of the photon energy adjacent to the absorption edge of the X-ray filter $3_1$ can be detected. This system, although there are restrictions as to the spectra of X rays being measured, has the advantage that measurements can be made with a simple arrangement.

As well, in consequence of the adjustment that has been made to the thicknesses $d_1$, $d_2$ of two types of filters $3_1$, $3_2$, regardless of the presence of the absorption edge in particular, if the X rays of specific photon energy can be detected when the differential signal is obtained, such will be likewise effective as the system of the present invention.

In accordance with the embodiments shown, the present invention will be explained in detail below.

FIRST EMBODIMENT

Figure 1:
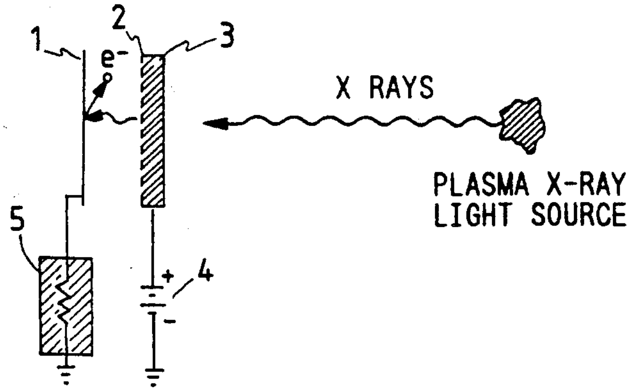
FIG. 1 PRIOR ART
FIG. 1 is a conceptional view of an XRD.
Figure 2:
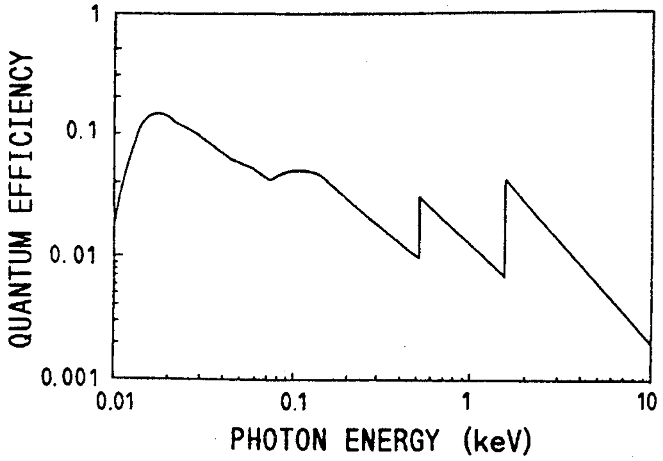
FIG. 2 PRIOR ART
FIG. 2 is a diagram showing the relationship between the photon energy of incident X-rays of the XRD and the amount of electric charge produced per unit X-ray energy at an Al cathode.
Figure 3:
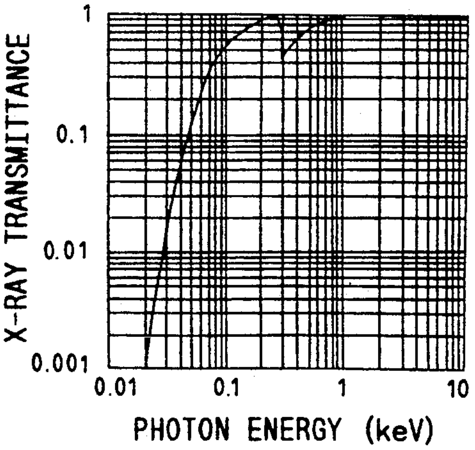
FIG. 3 PRIOR ART
FIG. 3 is a diagram showing the relationship between the photon energy of X-rays and the X-ray transmittance of an X-ray filter made of carbon having a thickness of 0.1 μm.
Figure 4A:
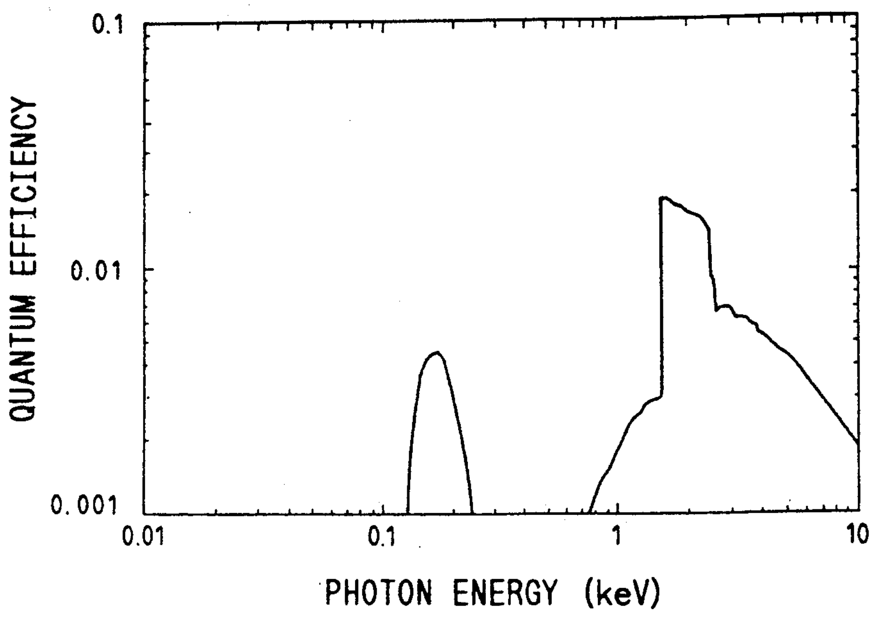
FIG. 4A PRIOR ART
FIGS. 4A and 4B are diagrams showing the quantum efficiency of respective embodiments of the XRD.
Figure 4B:
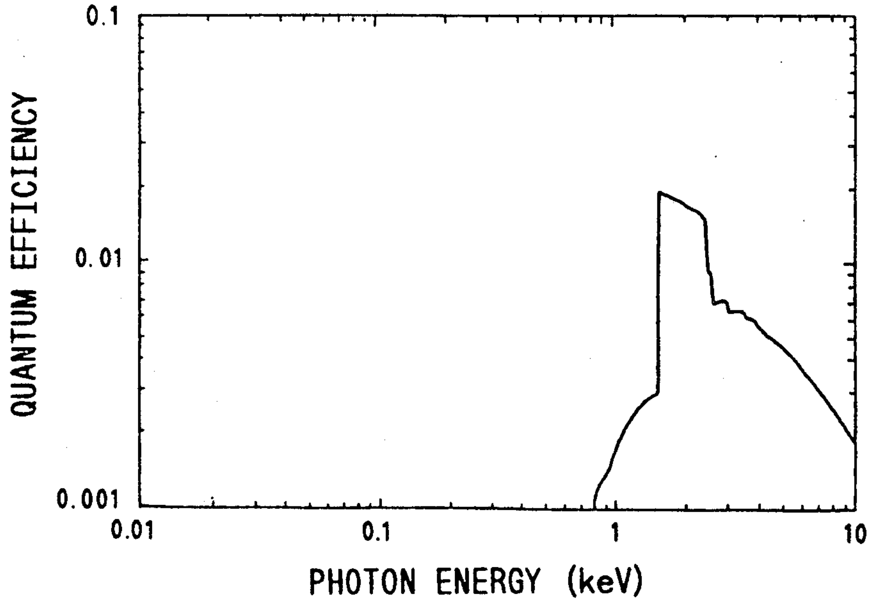
FIG. 4B PRIOR ART

This embodiment makes use of the grazing incidence mirror, in which when the reflectance of the grazing incidence mirror is taken as $R(\theta, E)$, the spectral transmittance of the X-ray filter as t (E), and the quantum efficiency of the photodiode as QE(E), the quantum efficiency T(E) of the entire system per photon of the photon energy E is given by $$T(E) = R(\theta, E) \cdot t(E) \cdot QE(E) \quad (3)$$

where $\theta$ is the grazing angle at which the X rays are incidentt on the grazing incidence mirror and E is the photon energy of the X rays. Further, t(E) is given by $t(E) = \exp(-d \cdot \mu)$(where d is the thickness of the X-ray filter and $\mu$ is the absorption coefficient of a substance constituting the filter to the X rays). The T(E) is the quantity corresponding to the quantum efficiency of the XRD in FIG. 4.

Figure 11:
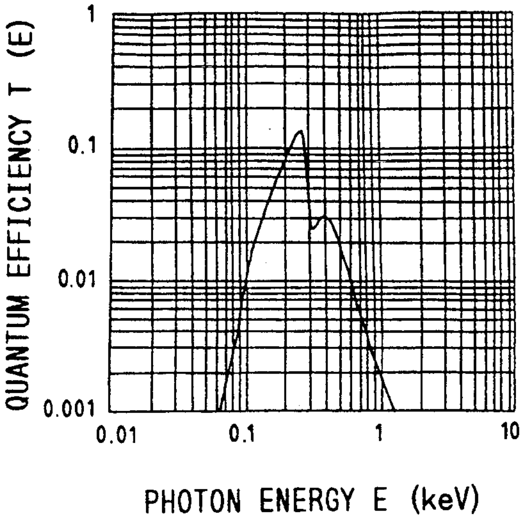
FIGS. 11 and 12 are diagrams showing the quantum efficiency where an Al graving incidence mirror is used at a grazing angle of 5°, together with a carbon X-ray filter 0.1 μm thick, and where an Au graving incidence mirror is used at a grazing angle of 2.5°, together with an Si X-ray filter 3 μm thick, respectively, in a first embodiment of the X-ray detector according to the present invention.

FIG. 11 shows calculation results of the quantum efficiency T(E) where the grazing incidence mirror made of A l is used at a grazing angle of 5° and the X-ray filter 0.1 $\mu$m thick, made of carbon C, is utilized. Here, the absorption coefficient is cited from the table of Bigges et al (refer to Sandia Lab Report SC-RR-71-0507) and $\delta$ and $\beta$ for calculating the reflectance $R(\theta,E)$ are given in the table of Henke et al (refer to Atomic data and Nuclear data table 27, 1-144 (1982)). Further, the quantum efficiency QE(E) is derived from the data of FIG. 6 on the assumption that the GaAsP photodiode is used.

The carbon C exhibits $k = 1.9 \times 10^{-4}$ and $\mu = 2372$ when the photon energy is 297 eV. The limit of the thickness of the carbon filter determined from these values occurs at 1.3 $\mu$m and the use of the filter makes it possible to measure the X-rays having the energy close to the photon energy of 297 eV, by means of adequate transmittance.

Figure 12:
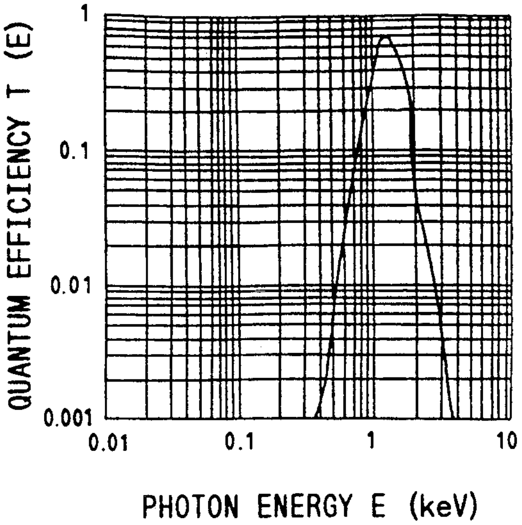

FIG. 12, on the other hand, shows the quantum efficiency T(E) where the grazing incidence mirror made of Au is used at a grazing angle of 2.5° and the X-ray filter 3 $\mu$m thick, made of Si, is utilized. For the photodiode, it is likewise assumed that the GaAsP photodiode is employed.

Si exhibits $k = 4.6 \times 10^{-6}$ and $\mu = 350$ when the photon energy is 1.89 keV. The thickness of the Si filter determined from these values is limited at 8.4 $\mu$m and, by using the filter, the X rays having the energy close to the photon energy of 1.89 keV can be measured with adequate transmittance.

According to FIG. 11, it is seen that the band pass is formed at 200-300 eV of the photon energy. Further, according to FIG. 12, it is seen that the band pass is formed at 1-2 keV. These results prove that the embodiment has the performance to the same extent as the wavelength selection characteristic of the XRD shown in FIG. 4. Also, in respect of the quantum efficiency T(E), this system is higher nearly one to two orders.

SECOND EMBODIMENT

This embodiment makes use of the combination of two X-ray filters and two photodiodes and is such that, as depicted in FIG. 9, based on the assumption that two GaAsP photodiodes are employed, an X-ray filter made of carbon and another X-ray filter made of boron are combined with the two photodiodes to form two detecting systems, generating the differential signal from between the two systems. The system making use of the carbon X-ray filter is assumed as a detecting system 1 and that of the boron X-ray filter as a detecting system 2.

Figure 13:
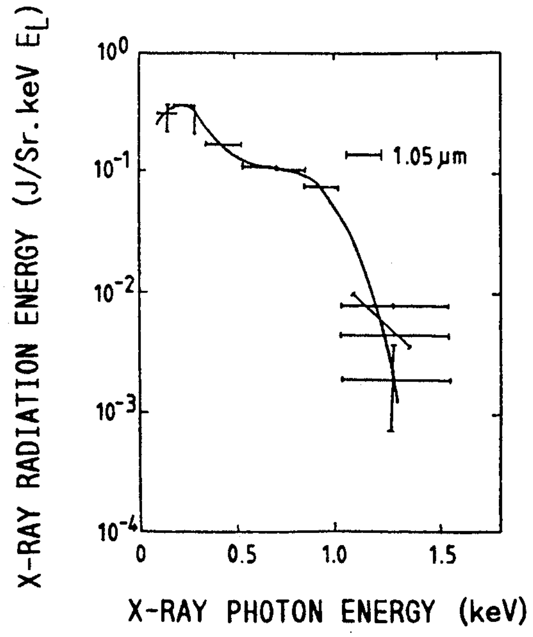
FIG. 13 is a diagram showing spectral characteristics of a typical laser plasma light source used in a second embodiment.

FIG. 13 diagrams the spectral distribution per unit solid angle and unit laser pulse of a typical laser plasma light source to Kazao Tanaka, "Source of Laser Plasma X-Ray, and their Applications", Vol. 07, No. 4 (1989), pages 187–193. This exhibits the spectra of soft X rays (h $\gamma$=0 1.5 keV) where the target of Au is irradiated, with a laser wavelength of 250 nm, a pulse width of 400 psec and a laser condensing intensity of $7\times10^{13}$ w/cm$^2$. The scale of the axis of ordinate represents the energy, as (J), per unit solid angle (Sr)$\times$unit photon energy (keV)$\times$unit laser energy ($E_L$).

When the spectrum of the laser plasma X-ray light source is taken as I(E) and the light source is measured by the detecting systems 1, 2, the number of electrons produced in the photodiodes for the photon energy E is given by the following formulae, where the number of electrons produced in the detecting system 1 is taken as $N_1$ (E) and the number of electrons produced in the detecting system 2 as $N_2$ (E).

$$N_1(E)=e^{-\mu_1 d_1}QE(E)I(E)/E \quad (4)$$

$$N_2(E)=e^{-\mu_2 d_2}QE(E)I(E)/E \quad (5)$$

Figure 14A:
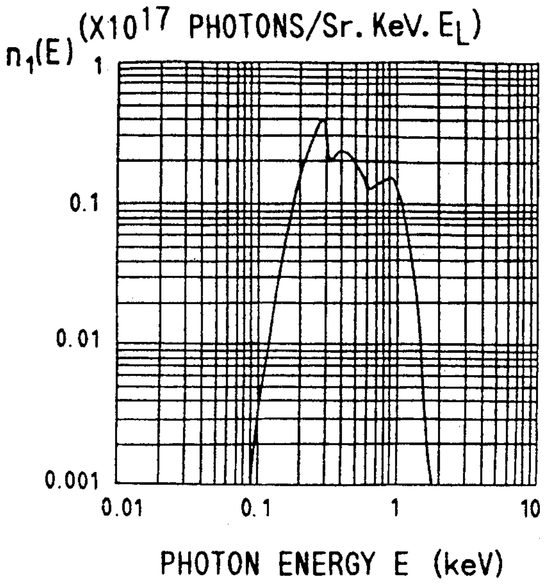
FIGS. 14A and 14B are diagrams showing the districution of the number of electrons produced in a detecting system 1 and a detecting system 2 of the second embodiment, respectively.
Figure 14B:
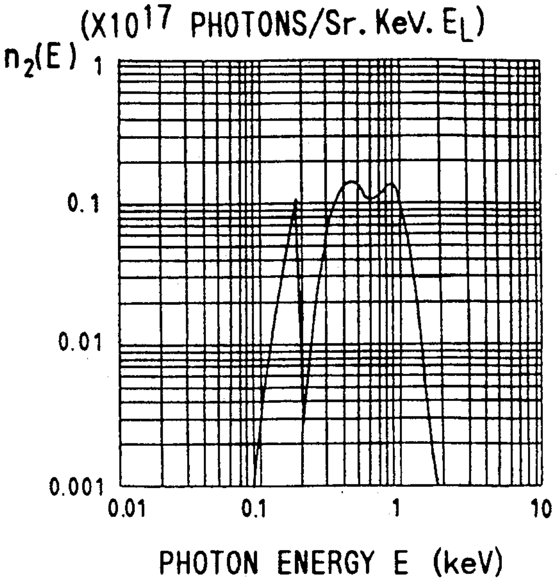
Figure 15:
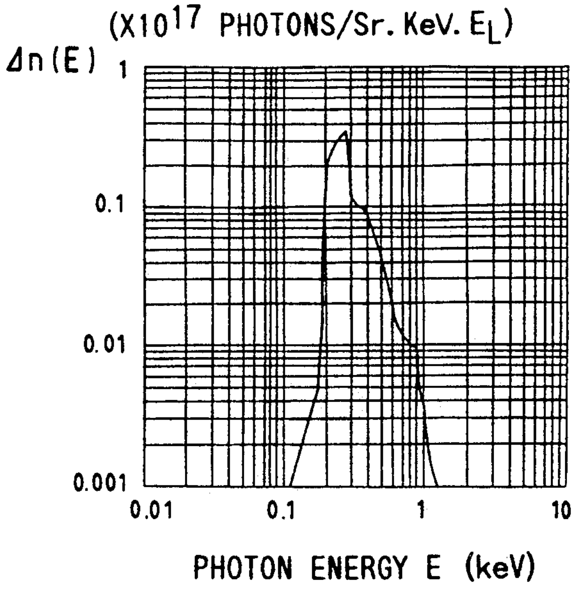
FIG. 15 is a diagram showing the distribution of absolute values of differential of the number of electrons produced in the detecting systems 1 and 2 of the second embodiment.

Here, $\mu_1$ and $d_1$ represent the absorption coefficient and thickness of the carbon X-ray filter, respectively, and $\mu_2$ and $d_2$ the absorption coefficient and thickness of the boron X-ray filter, respectively. Further, QE(E) and E, as in Equation (3), designate the quantum efficiency and photon energy of the GaAsP photodiode, respectively. FIGS. 14A and 14B show $N_1$ (E) and $N_2$ (E) where the thickness of the carbon X-ray filter is 0.1 $\mu$m and that of the boron X-ray filter is 0.24 $\mu$m, respectively. According to FIG. 13, the spectral intensity distribution of X rays of the light source is limited to less than 2 keV. Thus, if measurement is made through the carbon and boron high-pass filters, $N_1$ (E) and $N_2$ (E), as shown in FIGS. 14A and 14B, will be distributed between 0.1 keV and 2 keV. Further, the calculation of an absolute value $\Delta$N(E) of the differential between $N_1$ (E) and $N_2$ (E) of the detecting systems 1, 2 yields such results as shown in FIG. 15. According to FIG. 15, the absolute value $\Delta$N(E) increases between 0.2 keV and 0.3 keV. The differential signal from between the detecting systems 1, 2 exhibits the intensity of X rays of the band from 0.2 keV to 0.3 keV. Thus, the use of two photodiodes makes also it possible to perform the wavelength selection and intensity measurement of X rays.

As stated above, the X-ray detector according to the present invention has important advantages in practical use that the power source system does not come to a large scale, its periphery circuit is simple, and sensitivity is as high as one to two orders than that of the conventional X-ray diode. Furthermore, the X-ray detector, which is simple in structure, has a further advantage that its cost is reduced.

What is claim is:

1. An X-ray detector comprising an X-ray filter constructed from a substance layer having a thickness smaller than a value d defined by the following formula and a semiconductor light-receiving element disposed behind said X-ray filter so that X rays which have been transmitted through said X-ray filter fall on said semiconductor light-receiving element:

$$d=0.054\lambda/k$$

where $\lambda$ is the wavelength of an X ray being detected and k is the imaginary part of the complex index of refraction of a substance constituting the filter.

2. An X-ray detector according to claim 1, wherein a grazing incidence mirror is arranged in front of said X-ray filter so that the X rays which have been reflected from said grazing incidence mirror fall on said semiconductor light-receiving element through said X-ray filter.

3. An X-ray detector according to claims 1 or 2, wherein said semiconductor light-receiving element on which the X rays fall produces an electric charge in response to the amount of light received and a measuring device for measuring the amount of said electric charge is connected to said semiconductor light-receiving element.

4. An X-ray detector according to claim 3, wherein said X-ray filter is made of one of carbon and silicon.

5. An X-ray detector according to claim 3, wherein said grazing incidence mirror is made of one of aluminum and gold.

6. An X-ray detector according to claim 3, wherein said semiconductor light-receiving element is a photodiode.

7. An X-ray detector, comprising two X-ray filters different in transmittance from each other, two semiconductor light-receiving elements arranged respectively behind said two X-ray filters, and a measuring device for measuring a differential between output signals issued from said two semiconductor light-receiving elements, wherein a thickness of at least one of said two X-ray filters is smaller than a value d defined by the following formula:

$$d=0.054\lambda/k$$

where $\lambda$ is the wavelength of an X ray being detected and K is an imaginary part of the complex index of refraction of a substance constituting the filter.

8. An X-ray detector according to claim 7, wherein a first filter which is one of said two X-ray filters is made of a substance having an absorption edge in the range of wavelengths of X rays detected by said X-ray detector and a second filter which is the other of said two X-ray filters is made of a substance devoid of the absorption edge in the range of wavelengths of the X rays.

9. An X-ray detector according to claim 8, wherein said first filter is made of boron and said second filter is made of carbon.

* * * * *